United States Patent [19]

Maucher et al.

[11] Patent Number: 4,626,696

[45] **Date of Patent: * Dec. 2, 1986**

[54] FLYWHEEL PROPULSION SYSTEM FOR AUTOMOTIVE VEHICLES OR THE LIKE

[75] Inventors: Paul Maucher, Sasbach; Oswald Friedmann, Lichtenau; Siegfried Sonntag, Vaihingen, all of Fed. Rep. of Germany

[73] Assignee: Luk Lamellen und Kupplungsbau GmbH, Bühl, Fed. Rep. of Germany

[ * ] Notice: The portion of the term of this patent subsequent to Jul. 3, 2001 has been disclaimed.

[21] Appl. No.: 626,747

[22] Filed: Jul. 2, 1984

Related U.S. Application Data

[63] Continuation of Ser. No. 333,468, Dec. 22, 1981, Pat. No. 4,458,156.

[30] Foreign Application Priority Data

Dec. 24, 1980 [DE] Fed. Rep. of Germany ....... 3048972

[51] Int. Cl.4 ................................................ B60K 9/04

[52] U.S. Cl. ................................ 290/38 R; 290/38 B; 290/27; 290/28; 180/165; 123/179 J; 310/74

[58] Field of Search ....................... 290/27, 28, 47, 38; 310/74, 76, 77, 78, 153, 112; 322/4; 180/54.1, 165; 280/200, 217, 3; 123/179 A, 179 J, 179 M, 179 R

[56] References Cited

U.S. PATENT DOCUMENTS

| | | | |
|---|---|---|---|
| 3,497,706 | 2/1970 | Burkett et al. | 310/74 X |
| 3,652,883 | 3/1972 | Cone | 310/74 |
| 4,211,452 | 7/1980 | Poubeau | 310/74 X |
| 4,252,208 | 2/1981 | Heidemeyer et al. | 180/165 |
| 4,317,435 | 3/1982 | Kohlhage | 123/179 J |
| 4,346,773 | 8/1982 | Hofbauer et al. | 180/165 |
| 4,405,031 | 9/1983 | Rotter | 180/165 |
| 4,410,074 | 10/1983 | Maucher et al. | 123/179 J X |
| 4,416,360 | 11/1983 | Fiala | 180/165 X |
| 4,420,070 | 12/1983 | Maucher et al. | 123/179 J X |
| 4,423,794 | 1/1984 | Beck | 180/165 |
| 4,426,585 | 1/1984 | Bigalke | 290/38 R X |
| 4,445,601 | 5/1984 | Hofbauer et al. | 180/165 X |
| 4,456,830 | 6/1984 | Cronin | 290/27 |
| 4,458,156 | 7/1984 | Maucher et al. | 290/38 B |

*Primary Examiner*—William M. Shoop, Jr.
*Assistant Examiner*—Shik Luen Paul Ip
*Attorney, Agent, or Firm*—Peter K. Kontler

[57] ABSTRACT

A propulsion system for use in automotive vehicles wherein the flywheel is connectable with the crankshaft of the internal combustion engine by a first clutch and with the input shaft of the change-speed transmission by a second clutch. When the engine would be idling (such as during stoppage of the vehicle at an intersection) or running unnecessarily for another reason (such as during coasting of the vehicle), the two clutches are disengaged and the flywheel rotates by inertia to restart the engine, when necessary, in response to engagement of the first clutch. If the RPM of the flywheel reaches a preselected lower threshold value, a starter-generator unit automatically accelerates the flywheel so that its RPM rises above the threshold value and is thus sufficient to ensure that the engine is restarted on engagement of the first clutch. The starter-generator unit has a rotor which is mounted directly on the flywheel and a stator which surrounds the rotor with minimal clearance and is connected directly to the housing of the engine. The generator of the starter-generator unit is a heteropolar Schmidt-Lorenz generator.

26 Claims, 4 Drawing Figures

FLYWHEEL PROPULSION SYSTEM FOR AUTOMOTIVE VEHICLES OR THE LIKE

This application is a continuation of application Ser. No. 333,468, filed Dec. 22, 1981, now U.S. Pat. No. 4,458,156.

BACKGROUND OF THE INVENTION

The present invention relates to propulsion systems in general, and more particularly to improvements in propulsion systems which can be utilized to transmit torque to the wheels of automotive vehicles or the like. Still more particularly, the invention relates to improvements in so-called flywheel propulsion systems wherein a flywheel can be used to receive torque from or to transmit torque to the output means of a power plant, such as an Otto engine or a diesel engine.

It is already known to equip a propulsion system for automotive vehicles or the like with a flywheel which can be connected to or disconnected from the crankshaft of the internal combustion engine by a suitable clutch and wherein the flywheel forms part of or cooperates with a combined starter-generator unit. The stator of the starter-generator unit is affixed to the housing of the engine and the rotor of such unit is connected with the flywheel. Reference may be had to German Pat. No. 932,334 which discloses a friction clutch interposed between the crankshaft of the engine and the flywheel, and wherein the rotor is affixed to the flywheel so as to rotate with reference to a stator which is attached to the housing of the internal combustion engine. Such starter-generator units are of particular advantage in propulsion systems of the type disclosed in U.S. Pat. No. 4,252,208 because they contribute to a substantial reduction of energy requirements of the power plant. Publication No. 27 48 697 discloses a system wherein the engine can be arrested (i.e., the consumption of fuel terminated) during idling as well as under certain other circumstances, such as during coasting of the vehicle, i.e., whenever the engine is not required to transmit motive force to the front and/or rear wheels of the conveyance. The flywheel rotates due to inertia while the engine is brought to a halt. To this end, the propulsion system which is disclosed in U.S. Pat. No. 4,252,208 comprises a second clutch which is interposed between the input shaft of the change-speed transmission and the flywheel and is disengaged when the vehicle is coasting or when the engine is idling. The clutch between the flywheel and the crankshaft of the engine is engaged when the engine is to be started again; the flywheel then turns the crankshaft so as to set the engine in operation. The flywheel can rotate due to inertia for a relatively long interval of time (e.g., while the operator of the vehicle awaits the traffic signal to change from red or yellow to green) because both clutches can be disengaged during idling or coasting so that the flywheel can rotate independently of the engine crankshaft as well as independently of the input shaft of the transmission. The flywheel can be used to start the engine if the energy which is stored therein at the time the operator wishes to restart the engine suffices to turn the crankshaft at the speed and for an interval which is required to reestablish the operative condition of the power plant. Thus, all that is necessary to start the engine (while the flywheel still rotates at a sufficiently high speed) is to engage the clutch between the crankshaft and the flywheel. Once the engine is started, the clutch between the flywheel and the input shaft of the transmission is engaged to establish the flow of power from the engine to the parts (such as wheels) which receive torque from the output element or elements of the transmission.

In order to prevent excessive deceleration of the flywheel during the intervals of stoppage of the engine (e.g., during the aforementioned phase of operation of the vehicle which involves idling or coasting), the propulsion system of the type disclosed in U.S. Pat. No. 4,252,208 can be provided with a special starter motor whose purpose is to prevent the RPM of the flywheel from decreasing below a predetermined threshold value, i.e., an RPM which suffices to ensure reliable starting of the engine in response to engagement of the clutch between the crankshaft and the flywheel. The arrangement is such that the starter motor maintains the RPM of the flywheel within a certain range whose lower limit is the aforementioned threshold value. In heretofore known propulsion systems of the just outlined character, the starter motor transmits torque to the flywheel through the medium of a friction wheel which is movable into or from engagement with the flywheel, depending on the operating conditions, i.e., when the vehicle is arrested at an intersection or for other reasons or during coasting such as when the vehicle travels downhill and, consequently, the engine need not drive the wheels. A drawback of such mode of transmitting torque to the flywheel is that mechanical losses during frictional engagement between the friction wheel and the flywheel are relatively high. Moreover, the space requirements of the starter motor are substantial so that such motor cannot be readily installed in many types of automotive vehicles wherein, as a rule, the space below the hood is at a premium. Still further, the circuitry which is needed to establish or terminate the torque transmitting connection between the starter motor and the flywheel is complex, highly sensitive and expensive.

Applicants are further aware of U.S. Pat. No. 4,346,773 which is not. This patent discloses a coil-free rotor on the flywheel and a stator which is attached to a housing for two clutches one of which can connect the crankshaft of an internal combustion engine with the flywheel and the other of which can connect the flywheel with the input shaft of a change-speed transmission. The rotor of the propulsion system which is disclosed in this patent is not mounted on a component part of the clutch between the crankshaft of the engine and the flywheel.

OBJECTS AND SUMMARY OF THE INVENTION

An object of the invention is to provide a propulsion system wherein the power plant can receive torque from a flywheel and the flywheel cooperates with a starter-generator unit in a novel and improved way.

Another object of the invention is to provide a simple, compact and reliable starter-generator unit for use in a propulsion system of the above outlined character.

A further object of the invention is to provide a novel and improved stator for use in the starter-generator unit of the above outlined propulsion system.

An additional object of the invention is to provide a propulsion system which can be used with particular advantage in automotive vehicles and wherein the flywheel can be disengaged from or reconnected, in a simple and space-saving manner, with the assemblies which receive torque therefrom or transmit torque thereto.

Another object of the invention is to provide a propulsion system of the above outlined character wherein the constituents are associated and assembled with each other in such a way that they are readily accessible for inspection, repair and/or replacement.

A further object of the invention is to provide a novel and improved flywheel for use in the above outlined propulsion system.

An additional object of the invention is to provide novel and improved means for starting the internal combustion engine of an automotive vehicle after an interval of stoppage, coasting or another stage or phase during which the engine is not required to transmit torque to the wheels and/or other rotary or otherwise movable parts of the conveyance.

Another object of the invention is to provide the above outlined propulsion system with novel and improved means for transmitting torque to the flywheel at a time when the power plant is idle or is running but is disconnected from the flywheel.

The invention is embodied in a propulsion system, particularly for the wheels of automotive vehicles, and comprises a power plant (e.g., an internal combustion engine) having a stationary component (which may constitute the housing of the engine) and rotary output means (e.g., the crankshaft of the engine); a starter-generator unit which includes a flywheel coaxial with the output means of the power plant, first clutch means which is actuatable (e.g., by a fluid-operated servo arrangement) to connect the output means of the power plant with the flywheel so that the latter can drive the output means or vice versa, rotor means (preferably including a coil-free laminated annular rotor) affixed to the flywheel, annular stator means, and means for securing the stator means directly to the stationary component of the power plant so that the stator means concentrically surrounds the rotor means and defines a narrow air gap of predetermined width which can be gauged during assembly by suitable caliper means or the like; transmission means (such as a multi-speed or change-speed transmission of the type used in automotive vehicles) having rotary input means coaxial with the flywheel; and second clutch means which is actuatable (such as by a fluid-operated servo arrangement) to connect the flywheel with the input means of the transmission means.

The stator means of the starter-generator unit (whose generator is preferably a heteropolar generator such as a Schmidt-Lorenz generator) comprises laminations which surround the flywheel, and windings (preferably several discrete groups of windings each including a plurality of first or working windings flanked by field windings) which are supported by the laminations, preferably by radially outwardly extending webs or ribs of the laminations.

The propulsion system preferably further comprises signal generating means (such as detectors which ascertain the speed of the output means of the power plant, the speed of the output means of the transmission means and/or the speed of the flywheel) for monitoring a plurality of parameters of the propulsion system, and control means which is operative to effect the actuation of the first and/or second clutch means in response to reception of predetermined signals from the monitoring means so as to selectively couple the flywheel with or disconnect the flywheel from the output means of the power plant and/or to selectively couple the flywheel with or disconnect the flywheel from the input means of the transmission means.

The stationary component of the power plant preferably comprises a first portion (such first portion may constitute the housing proper of an Otto engine or a diesel engine) having a preferably flat supporting surface, and a second portion which may constitute a substantially bell-shaped cover connected to the first portion of the stationary component by the aforementioned securing means and at least partially surrounding the flywheel. The stator means is then disposed between the surface of the first portion of the stationary component and the second portion. The securing means can comprise distancing and centering sleeves extending through aligned bores or holes provided therefor in the stator means and in the surface of the first portion of the stationary component of the power plant, and bolts or analogous threaded fasteners extending through the sleeves and meshing with the stationary component, i.e., with the first portion of the stationary component.

A portion of the flywheel may constitute a part, particularly a pressure plate, of the first clutch means and may have a radially outwardly extending flange which is closely or immediately adjacent to the surface of the first portion of the stationary component. The just mentioned portion of the flywheel is preferably surrounded by the rotor means of the starter-generator unit, and the propulsion system further comprises one or more bolts, screws or other suitable means for holding the pressure plate of the first clutch means against axial movement with reference to the output means of the power plant. The flywheel can further comprise a substantially disc-shaped carrier for the pressure plate and/or other elements of the first clutch means, and the rotor means is then disposed between the carrier and the aforementioned flange of the pressure plate.

Additional features of the invention reside in the design of the rotor means and in the grouping of various parts relative to each other.

The novel features which are considered as characteristic of the invention are set forth in particular in the appended claims. The improved propulsion system itself, however, both as to its construction and its mode of operation, together with additional features and advantages thereof, will be best understood upon perusal of the followin detailed description of certain specific embodiments with reference to the accompanying drawing.

DESCRIPTION OF THE PREFERRED EMBODIMENTS

Figure 1:
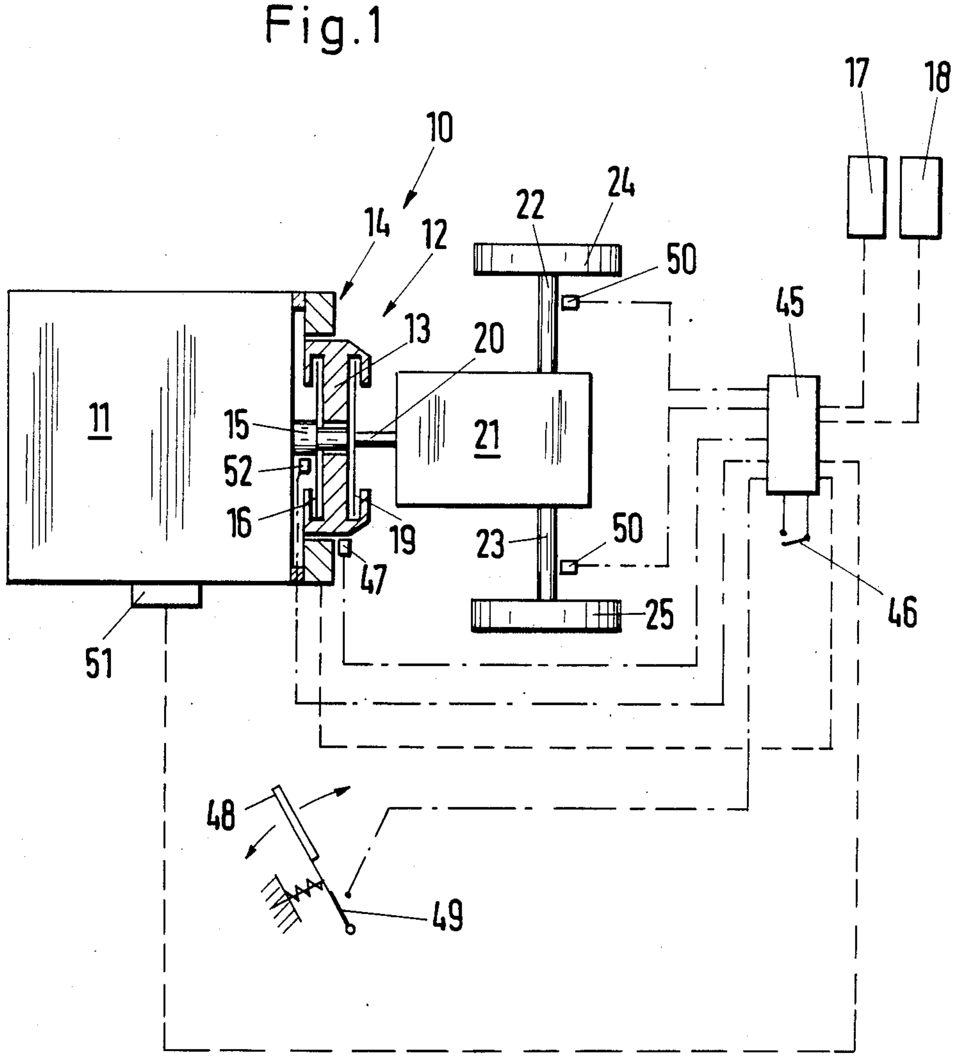
FIG. 1 is a block diagram of a propulsion system which embodies the invention and can be used to drive the wheels of an automotive vehicle, with certain parts of the system shown in section.

FIG. 1 shows a propulsion system 10 having a power plant 11 which may constitute a conventional internal combustion engine and can be started by a flywheel starter-generator unit 12 including a flywheel 13 connectable with the crankshaft (output means) 15 of the engine 11. When the unit 12 functions as a generator, it charges the battery (not shown) of the vehicle embodying the engine 11. A first clutch 16 of the starter-generator unit 12 connects the crankshaft 15 with the flywheel 13, and a second clutch 19 serves to connect the flywheel 13 with the rotary input shaft 20 of a variable-speed transmission 21 having output shafts 22 and 23 which drive the wheels 24 and 25 of the vehicle, preferably by way of a differential, not shown. The actuating means for engaging or disengaging the clutch 16 is shown at 17, and the actuating means for engaging or disengaging the clutch 19 is shown at 18.

Figure 2:
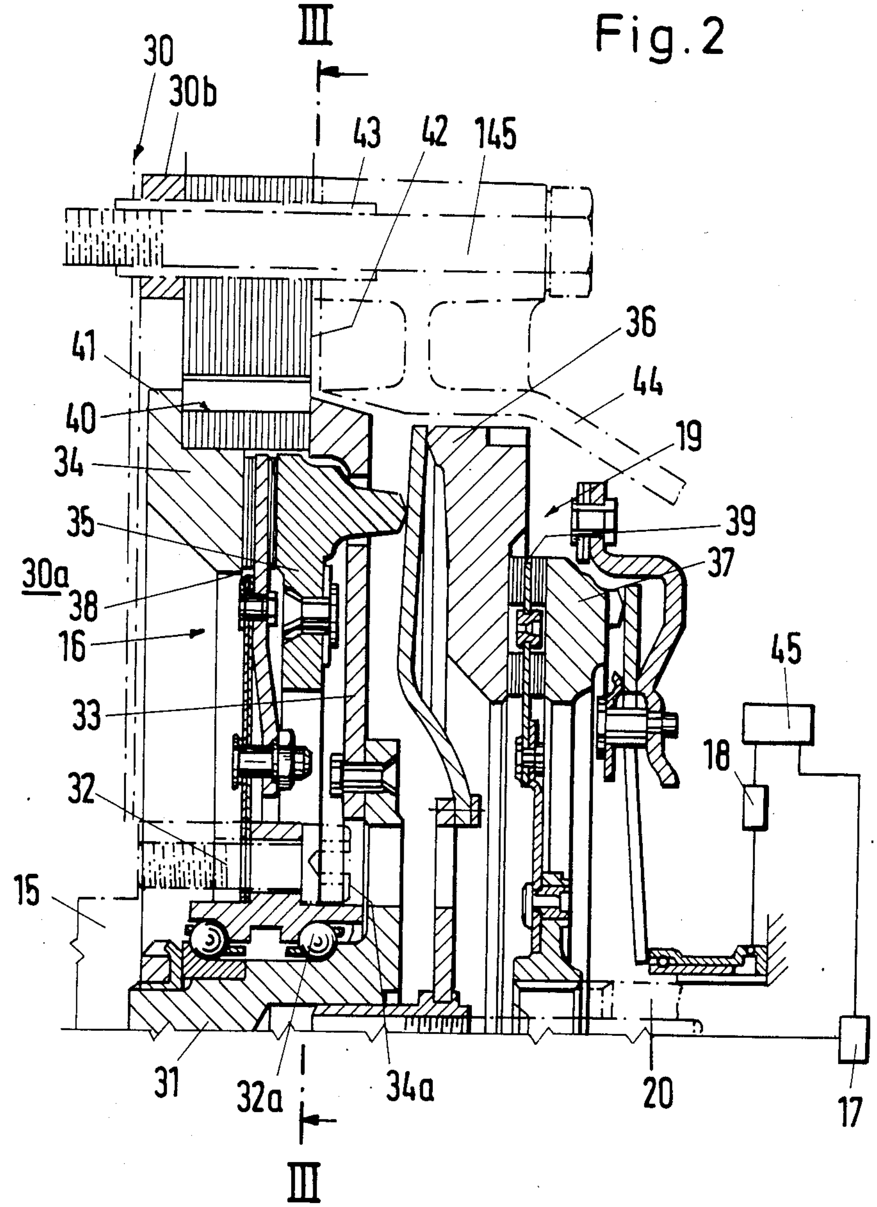
FIG 2 is an enlarged fragmentary axial sectional view of the power plant, starter-generator unit, second clutch means and transmission means.

FIG. 2 shows a supporting or contact surface 30 of a first portion 30*a* of a stationary component or housing of the engine 11. The crankshaft 15 (which is indicated by phantom lines) is coaxial with the input shaft 20 of the transmission 21 (not shown in FIG. 2) and with a bearing pin 31 for the hub 32 of the flywheel 13. The hub 32 is rotatable on one or more antifriction ball bearings 32*a* which surround the pin 31 and is rigidly connected with the crankshaft 15 by bolts 34*a* which hold a pressure plate 34 of the clutch 16 against axial movement with reference to the crankshaft. The pin 31 can be said to form part of the flywheel 13 which further comprises a plate-like disc or carrier 33 rigid with the pin 31 and four pressure plates including the pressure plate 34 and three additional pressure plates 35, 36 and 37. The clutches 16, 19 together constitute a so-called double friction clutch which further comprises two clutch discs 38, 39 and suitable clutch springs of known design. Reference may be had to commonly owned U.S. patent application Ser. No. 143,559, corresponding to German patent application Ser. No. P 29 17 138.8, whose disclosure is incorporated herein by reference. As mentioned above, the clutch 16 can be actuated at 17 to connect the crankshaft 15 (i.e., the output means of the engine 11) with or to disconnect such crankshaft from the flywheel 13, and the clutch 19 can be actuated at 18 to connect the flywheel 13 with or to disconnect the flywheel from the input element 20 of the transmission 21.

The clutch plate 34 is fixed against movement in the axial direction of the crankshaft 15 and/or other parts of the flywheel 13 by the bolts 34*a* and is adjacent to the aforementioned supporting surface 30 of the housing portion 30*a*. The periphery of the clutch plate 34 supports a winding- or coil-free package 40 of laminations constituting the rotor of the starter-generator unit 12. The rotor 40 of the unit 12 is disposed between a radially outwardly extending flange 41 of the pressure plate 34 and the radially outermost portion of the carrier 33. The flange 41 is adjacent to the surface 30 of the housing portion 30*a* and the carrier 33 is secured to the rotor 40 by screws or analogous fastener means, not shown.

The laminated stator 42 of the unit 12 is provided with exciting and field windings; this stator surrounds the rotor 40 on the parts 33, 34 and is secured to housing portion 30*a* of the engine 11 by a distancing ring 30*b* and a set of axially parallel bolts 145 or analogous fasteners which extend through sleeves 43 passing through registering bores or holes of the stator 42 and surface 30. The bolts 145 connect the stator 42 with the stationary component portion 30*a* of the engine 11 as well as with a substantially bell-shaped second stationary component portion or housing portion 44 constituti a cover for the friction clutches 16, 19 and the flywheel 13. The housing portion 30*a* of the engine 11 has tapped bores for the shanks of the bolts 145.

If the operator wishes to start the engine 11, the actuating means 17, 18 are operated to disengage the clutches 16, 19, i.e., to disconnect the crankshaft 15 from the flywheel 13 and to disconnect the flywheel 13 from the input shaft 20 of the variable-speed transmission 21. This can be achieved by way of a control unit 45 including a switch 46, both shown in FIG. 1. When the clutches 16 and 19 are disengaged, the control unit 45 causes the starter-generator unit 12, which then performs the function of a starter, to raise its RPM from zero to a predetermined threshold value which is indicated to the control unit 45 by a suitable tachometer generator 47. The flywheel 13 rotates with the rotary component of the starter-generator unit 12 and the tachometer generator 47 constitutes a conventional RPM monitoring device which is adjacent to the periphery of the flywheel 13. When the RPM of the flywheel 13 reaches the threshold value, the control unit 45 causes the actuating device 17 to engage the clutch 16 which connects the rotating flywheel 13 with the crankshaft 15 of the engine 11 so that the flywheel 13 starts the engine. When the engine is running, the tachometer generator 47 transmits to the control unit 45 a signal which causes the unit 12 to perform as a generator serving to charge the battery of the vehicle including the propulsion system 10.

In normal use, i.e., when the engine 11 drives the wheels 24 and 25, the clutches 16 and 19 are engaged. The engagement of clutch 19 is effected by the device 18 in a conventional manner when the opeator desires to shift into another gear, i.e., to change the ratio of the transmission 21. When the vehicle is operated under circumstances such that the wheels 24 and 25 are not or need not be driven by the engine 11, for example, when the vehicle is coasting and the operator's foot does not maintain the gas pedal 48 in depressed position, the pedal 48 or another component which is operatively or otherwise associated therewith, closes a switch 49 whereby the control unit 45 receives a signal which initiates disengagement of the clutches 16 and 19 via actuating means 17 and 18. At such times, the control unit 45 further receives or accepts signals transmitted by signal generating devices 50 which are adjacent to the output shafts 22, 23 or to the wheels 24, 25 and serve to generate signals which denote certain operating conditions. The thus generated signals are processed by the control unit 45. At the same time, the control unit 45 causes a fuel flow regulating device 51 to interrupt the admission of fuel to the cylinders of the engine 11 with attendant savings in energy. Alternatively, the device 51 can interrupt the ignition circuit of the engine 11. All that counts is to insure that the device 51 reduces or interrupts the consumption of fuel, either by preventing the admission of fuel while the clutches 16, 19 are disengaged, by preventing firing of the spark plugs, or by preventing such firing as well as the admission of fuel. The flywheel 13 (which is disengaged from the crankshaft 15 as well as from the input shaft 20) rotates due to inertia but the engine 11 comes to a halt in view of the provision of the device 51 which becomes effective as soon as the control unit 45 transmits signals for disengagement of the clutches 16, 19.

If the operator desires to restart the engine, he or she simply depresses the gas pedal 48 so as to open the switch 49 which causes the control unit 45 to deactivate the device 51 (i.e., the ignition circuit and/or the fuel admitting means of the engine 11 becomes operative). Furthermore, the signal which is transmitted on opening of the switch 49 as a result of depression of the gas pedal 48 causes the control unit 45 to engage the clutch 16 via actuating means 17. The flywheel 13 then drives the crankshaft 15 which starts the engine 11.

When the flywheel 13 rotates due to inertia (i.e., when the clutches 16 and 19 are disengaged), it is advisable to maintain the windings of the rotor 40 in deenergized condition. However, if the flywheel 13 is idling for a certain interval of time so that its RPM is likely to drop below the aforementioned threshold value, namely, below that value which still suffices to effect the starting of the engine 11 in response to depression of the pedal 48 and resulting admission of fuel and/or completion of the ignition circuit via device 51 as well as in response to engagement of the clutch 16 so that the flywheel 13 can rotate the crankshaft 15 at a speed which is still sufficient to start the engine 11, the starter-generator unit 12 should be set in operation in order to ensure that its rotor 40 drives the flywheel 13 at a speed which does not drop below the aforementioned threshold value. The speed of the flywheel 13 is monitored by the tachometer generator 47 and, when such speed decreases below the threshold value, the tachometer generator 47 transmits a signal which causes the control unit 45 to activate the starter-generator unit 12 so that the rotor 42 begins to drive the flywheel 13. A further monitoring device 52 (e.g., a tachometer generator) is adjacent to a rotary component of the engine 11 (e.g., adjacent to the crankshaft 15) and serves to transmit to the control unit 45 signals denoting the condition of the engine, such as whether or not the engine 11 is idle and/or the actual RPM of the crankshaft 15.

As mentioned above, the laminations of the rotor 40 are mounted on the pressure plate 34 which forms part of the flywheel 13. This rotor resembles a gear (see FIG. 3) whose equidistant teeth 60 or analogous protuberances extend radially outwardly and are separated from each other by tooth spaces 61. The spacing between neighboring teeth 60 is uniform all the way around the circumference of the pressure plate 34. The rotor 40 is further formed with axially parallel bores or holes 63 for screws **63*a* or analogous fasteners serving to connect the flange 41 of the pressure plate 34 with carrier 33**.

The stator 42 surrounds the teeth 60 and tooth spaces 61 of the rotor 40 and is interrupted at 64 (see FIG. 3) along an arc of approximately or even less than 30°. It will be noted that the maximum radial dimensions of the stator 42 appreciably exceed those of the rotor 40. The laminations of the stator 42 are formed with annuli of registering axially parallel holes or bores 65 through which extend portions of the aforementioned distancing sleeves 43 for the aforementioned securing means or bolts 145. The stator 42 is provided with three groups or sets 66, 67 and 68 of windings. The groups 67, 68, 69 respectively comprise first or working windings 70, 71, 72 which are respectively flanked by combined field and exciting windings 73, 73' (group 66), 74, 74' (group 67) and 75, 75' (group 68). In other words, the working windings 70 of the group 67 are disposed between the field windings 73 and 73' and so forth. The front and rear ends of the field windings 73, 74 and 75 are respectively connected with the rear and front ends of the associated field windings 73', 74', 75' by bridges 76, 76' (group 66), 77, 77' (group 67) and 78, 78' (group 68). Furthermore, the rear ends of the windings 73', 74 are connected to each other by a bridge 79, and a further bridge 80 connects the windings 74' 75. The bridge 79 connects the rear end of the winding 73' with the front end of the winding 74, and the bridge 80 connects the rear end of the winding 74' with the front end of the winding 75. The front end of the field winding 73 and the rear end of the field winding 75 are connected with a source of d-c energy (e.g., a battery) via terminals 81, 82, conductor means 83, 84 and a control circuit 85 whose construction forms no part of this invention.

The working windings 70, 71 and 72 are installed in radially extending grooves of laminations of the stator 42. The spacing between two neighboring grooves of the lamination forming part of the stator 42 is half the spacing between the tooth spaces 61 of the rotor 40. Accordingly, the spacing between two neighboring webs or ribs 86 which form part of the stator 42 and define grooves for the windings 70, 71, 72 also equals half the spacing between two neighboring teeth 60 of the rotor 40, i.e., the spacing between neighboring webs 86 of a set equals n/2 wherein n is the spacing between neighboring teeth 60. An inspection of FIG. 3 will readily reveal that the stator 42 forms part of a three-phase alternator and the groups 66, 68 of windings are disposed in three different arcuate sections of the stator 42, namely each in a section which extends along an arc of approximately 120°. However, the spacing between neighboring groups is such that the distance between the groups 66 and 67 (as considered in the circumferential direction of the stator 42) is less than the distance between the groups 67 and 68, and the distance between the groups 67 and 68 is less than the distance between the groups 68 and 66. Furthermore, the distribution of ribs or webs 86 is such that each web 86 of the group 66 or 67 or 68 is separated from a web 86 by an arc of 120°. The working windings can be energized by the control circuit 85 via conductor means 88, 88' and terminals 87, 87' (group 66), conductor means 90, 90' and terminals 89, 89' (group 67), and conductor means 92, 92' and terminals 91, 91' (group 68). The working windings are energized by the control circuit 85 in the direction of rotation of the rotor 40 when the engine 11 is in use, and such energizing is effected in dependency on signals which the control circuit 85 receives from three sensors 94, 95, 96 via conductors 97, 98, 99. The positions of the sets of ribs or webs 86 in the three groups 66, 67, 68 (as considered in the circumferential direction of the rotor 40 and stator 42) are selected in such a way that, when the webs 86 in one of the groups 66–68 register with the adjacent teeth 60 of the rotor 40, the webs 86 of the other two groups are not in register with any teeth 60. Instead, the teeth 60 which are adjacent to the other two groups are then disposed at a predetermined phase angle with reference to the neighboring (but not registering) webs 86. In other words, when the webs 86 in the group 66 register with the adjacent teeth 60 of the rotor 40, the webs 86 in the group 67 are out of phase with the neighboring teeth 60 by a first angle and the webs 86 of the group 68 are out of phase with the neighboring teeth 60 by a second angle. The sensors 94, 95, 96 are staggered with reference to each other, as considered in the circumfererential direction of the stator 42.

Figure 3:
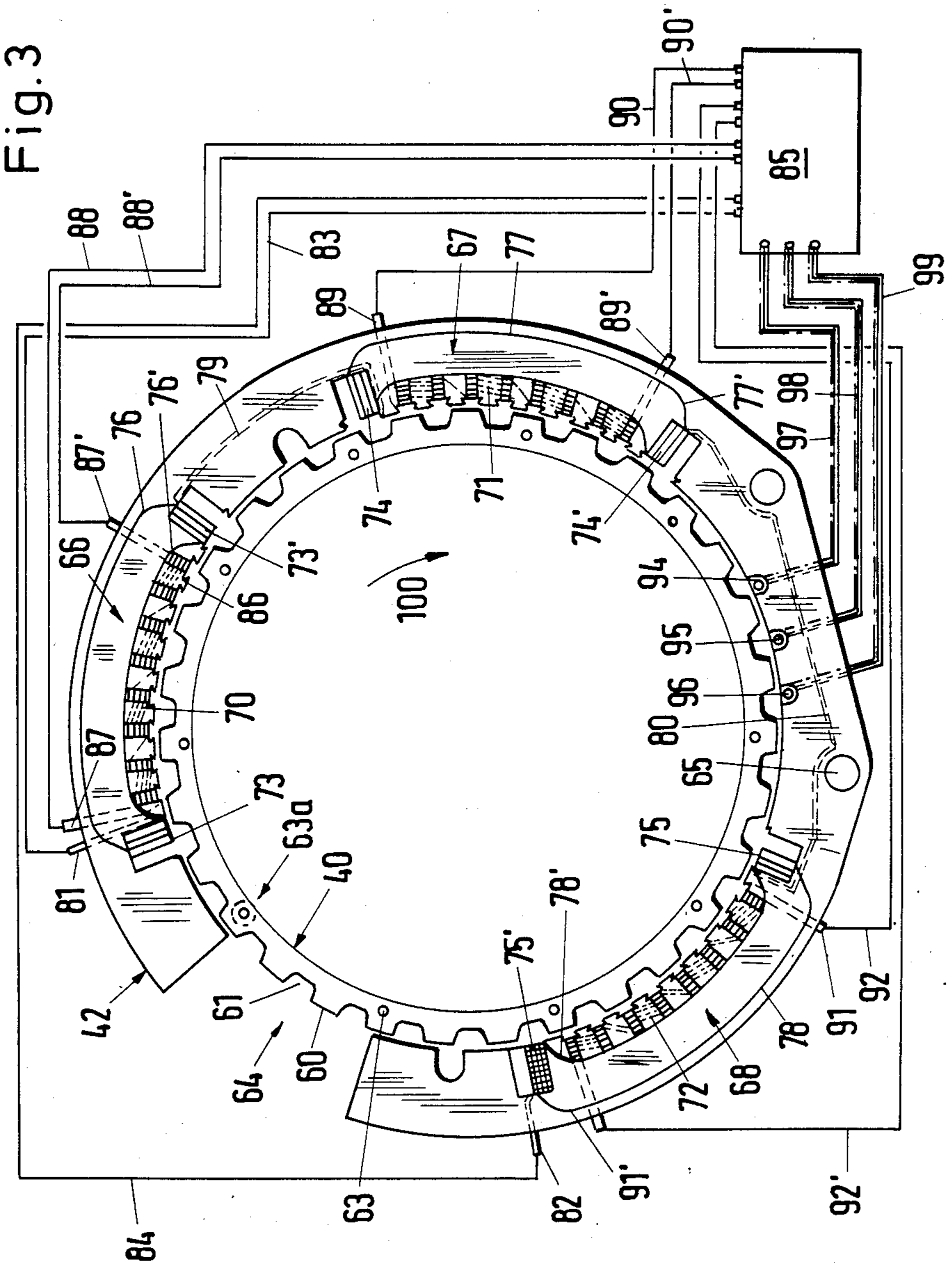
FIG. 3 is a smaller-scale fragmentary partly diagrammatic sectional view of the starter-generator unit as seen in the direction of arrows from the line III—III of FIG. 2.

In FIG. 3, each second web 86 of the group 66 is in register with a tooth 60. In the group 68, the teeth 60 of the rotor 40 are slightly ahead of positions of alignment with alternate webs 86. In the group 67, the angular displacement between the teeth 60 and the webs 86 is greater than (substantially twice that) in the group 68. It is assumed that the rotor 40 is to be driven in the direction of arrow 100 shown in FIG. 3. The rotor 40 can be set in motion so as to leave the position of FIG. 3 in response to energization of working windings 72 via control circuit 85. The magnetic flux which develops on energization of the windings 72 causes the teeth 60 to move into register with alternate webs 86 in the group 68. This causes the teeth 60 in the group 66 to move out of register with the adjacent webs 86, and the teeth 60 next to the group 67 move further out of register with the windings 71 so that the angular spacing between the teeth 60 and the windings 71 then matches that shown between the teeth 60 in the region of the group 68 and the windings 72. The windings 71 are then energized to again turn the rotor 40 in the direction of arrow 100, and this moves the teeth 60 further out of register with the windings 70 so that, when the windings 70 are energized after energization of the windings 71, they cause the rotor 40 to turn again in the direction of arrow 100, and so forth. The sensors 94, 95 and 96 monitor the angular position of the rotor 40 and transmit corresponding signals to the control circuit 45 which is then in a position to energize the appropriate windings 70, 71 or 72.

Starting of the engine 11 is effected in an analogous manner. Thus the sensors 94, 95, 96 transmit signals which denote the positions of those working windings which should be energized for the purpose of generating a force acting in the circumferential direction of and serving to set the rotor 40 in motion. In other words, the sensors 94–96 transmit signals pinpointing those teeth 60 which are in optimum positions to ensure that they will be caused to begin to move in the direction of arrow 100 in response to energization of the adjacent windings 70, 71 or 72.

An important advantage of the improved starter-generator unit 12 is that it occupies little room and, therefore, can be readily installed in an automotive vehicle. This is due, in part, to the fact that the stator 42 is mounted directly on that portion 30*a* of the stationary component or housing of the engine 11 which is provided with the supporting surface 30. The coil-free rotor 40 contributes to the radial dimensions of the flywheel 13, and the dimensions of the stator 42 must exceed the dimensions of the rotor, as considered in the radial direction of the flywheel. However, this renders it possible to achieve greater lever arms and to thus reduce the forces which the starter-generator unit 12 must furnish in order to maintain the RPM of the flywheel 13 above the threshold value, i.e., above that RPM at which the flywheel might not be capable of restarting the engine 11 in response to engagement of the clutch 16.

Another important advantage of the improved propulsion system 10 is that certain parts thereof can be assembled independently of the others. For example, the stator 42 can be fully assembled prior to installation in the housing of the engine 11, namely, in the space between the surface 30 of the portion 30*a* and the second housing portion or cover 44. This allows for greater automation of means for assembling the rotor 42 and thereby contributes to lower initial cost of the propulsion system.

The instruments (such as gauges, calipers or the like) which are preferably used to ensure that the rotor 40 is properly centered within the confines of the stator 42 and that the stator surrounds the rotor with a minimum of clearance (i.e., with a narrow air gap) are not specifically shown in the drawing. The feature that the entire stator 42 can be mounted on the stationary housing portion 30*a* so that it abuts against the supporting surface 30, and that such mounting can be achieved by resorting to relatively simple securing means (such as the illustrated sleeves 43 and bolts 145) allows for accurate centering of the stator 42 around the rotor 40. The bores of the sleeves 43 and the registering bores in the surface 30 can be drilled after the stator 42 is already centered with reference to the flywheel 13 and its rotor 40. However, it is equally within the purview of the invention to center the stator 42 with reference to the flywheel 13 and to thereupon establish a force-locking connection between the thus centered stator and the housing portion 30*a*, for example, by resorting to screws or the like.

The space requirements of the starter-generator unit 12 are further reduced due to the fact that the stator 42 surrounds that portion of the flywheel 13 which is immediately or closely adjacent to the surface 30 of the housing portion 30*a*, i.e., the stator surrounds the pressure plate 34 which is an element of the flywheel 13 and simultaneously constitutes a part of the clutch 16. The screws 34*a* hold the pressure plate 34 against axial movement with reference to the crankshaft 15. In order to reduce the radial dimensions of the stator 42, the rotor 40 is mounted in the aforedescribed manner, namely, between the radially outwardly extending flange 41 of the pressure plate 34 and the radially outermost portion of the carrier 33 which, too, is an element of the flywheel 13.

The improved propulsion system can employ practically any electrical machine which can be operated as a generator or as a motor and which has a coil-free rotor. A typical feature of such machines is the utilization of a rotor having an annulus of teeth which extend radially outwardly. The machine can be of the reluctance type or its operation may be based on the Guy principle or the linear principle. It has been found, however, that a heteropolar machine, especially a so-called Schmidt-Lorenz machine, is particularly suited for use in the propulsion system of the present invention. In the past, electrical machines whose operation is based on the Schmidt-Lorenz principle were used exclusively as generators. As can be seen by referring to FIG. 3, relatively minor modifications are needed to enable a Schmidt-Lorenz generator to serve as a motor, i.e., to set the flywheel 13 in rotary motion or to maintain the RPM of the rotating flywheel above a preselected threshold value.

Machines which rely on the Guy principle, as well as Schmidt-Lorenz machines, are disclosed, for example, in the article entitled "Mittelfrequenzumformer" (meaning "Medium-frequency transformer-generators") by Heinz Hupach and Tamas Szincsak, appearing on pp. 657–664 of ETZ (Elektrotechnische Zeitschrift) dated Nov 11, 1963 (Volume 15, No. 23) published by VDE (Verband Deutscher Elektrotechniker).

As mentioned above, the rotor 40 is installed in or on a portion of the flywheel 13, namely, on a portion which is a component part (pressure plate 34) of the clutch 16 because the latter is preferably integrated into the flywheel. Therefore, the generator of the starter-generator unit 12 is relatively large, as considered in the radial direction of the flywheel 13. However, this brings about the advantage that the windings of the stator 42 need not be provided all around the entire circumference of the rotor 40. Thus, the provision of three groups of windings in such an array that the neighboring groups are separated from each other by appreciable distances, as considered in the circumferential direction of the rotor 40, is sufficient to enable the electrical machine to furnish the required electrical energy. This holds especially true if the magnetic field is amplified in that the working windings in each of the spaced-apart discrete groups are disposed between field windings.

If the unit 12 is replaced with a two-phase unit, the distribution of the sets of webs 86 and protuberances or teeth 60 is such that the webs 86 of one set register with the adjacent teeth 60 when the webs 86 of the other set are out of register with the adjacent teeth 60 and vice versa. In the illustrated three-phase unit 12, each web 86 of the set of webs in the group 66 is in accurate register with an adjacent tooth 60 when the webs 86 of the set of webs in the group 67 or 68 are slightly out of register with the adjacent teeth 60 and the webs 86 of the set of webs in the groups 68 or 67 are even less aligned with the adjacent teeth 60, and so forth. All that counts is to ensure that one set of webs 86 is always in an optimum position to ensure the transmission of required torque to the rotor 40 when the windings of the group including the one set of webs 86 are energized by connecting them with the control circuit 85.

An important advantage of the stator-generator unit 12 which is shown in FIG. 3 is that the groups 66, 67 and 68 of windings are not immediately adjacent to each other. The aforediscussed asymmetric distribution of such windings (as considered in the circumferential direction of the rotor 40) provides ample room for means which secure the stator 42 to its carrier means, especially directly to a stationary component of the power plant 11. The illustrated stator 42 of the unit 12 exhibits three winding-free sections including a relatively short section between the groups 66, 67 and two longer sections between the groups 67, 68 and 68, 66 (as considered in the direction of arrow 100). The just discussed winding-free sections are particularly desirable and advantageous when the stator 42 is secured directly to the housing of the power plant 11. Care should be taken to ensure that shifting of the individual groups 66, 67 and 68 in the direction of arrow 100 takes place within the respective sectors (in the unit 12 of FIG. 3, each sector extends along an arc of 120°), i.e., that the windings of the group 66, 67 or 68 are not outside of the corresponding sector as well as that each tooth 60 which is adjacent to one of the groups makes with any one of the teeth 60 which are adjacent to a neighboring group of windings an angle equal to the quotient of the entire circumference and the number of sectors. As mentioned above, in the illustrated three-phase unit 12 the number of sectors equals three.

Another important advantage of the illustrated unit 12 is that the same working windings 70–72 are used when the unit 12 serves as a starter motor as well as when the unit 12 constitutes or performs the function of a generator. All that is necessary is to provide a suitable converter which effects the required switching-over depending upon whether the unit 12 acts as a starter or as a generator. Thus, the converter can effect a rectifying or an inverted rectifying operation. This renders it possible to avoid the well-known problems which arise when the dimensions of the stator must be increased owing to the provision of discrete windings for operation as a motor and for operation as a generator.

When the unit 12 is used as a starter (motor), the working windings are energized one after the other, as considered in the direction of rotation, by the control circuit 85 which receives appropriate signals from the sensors 94, 95 and 96 in such a way that the energized windings invariably ensure the generation of maximal torque for effecting a rotary movement of the flywheel 13. As mentioned above, the sensors 94, 95 and 96 monitor the positions of teeth 60 in the adjacent portion of the path of successive teeth. The number of sensors equals the number of phases of the unit 12 and each sensor may constitute a forked gate, an inductive transducer, a magnetoresistor, a Hall generator or a proximity detector operating on the basis of the Namur or Wiegand principle. It is further possible to employ photoelectronic transducers or reflection type cells; however, such types of sensors are rather sensitive so that, if used in an internal combustion engine, they must be shielded from dust and/or other foreign matter which could distort the output signals of their transducers.

Sensors whose operation is based on the aforementioned Namur principle are manufactured by Pepperl & Fuchs of Mannheim, Federal Republic Germany (reference may be had to the pamphlet entitled "Miniatur-Näherungsschalter" (meaning "miniature proximity switches") published by Pepperl & Fuchs in June 1979).

Sensors relying on the aforementioned Wiegand principle are manufactured by the West German firm DODUCO. Reference may be had to DODUCO pamphlet entitled "DODUPULS" published in Federal Republic Germany.

Figure 4:
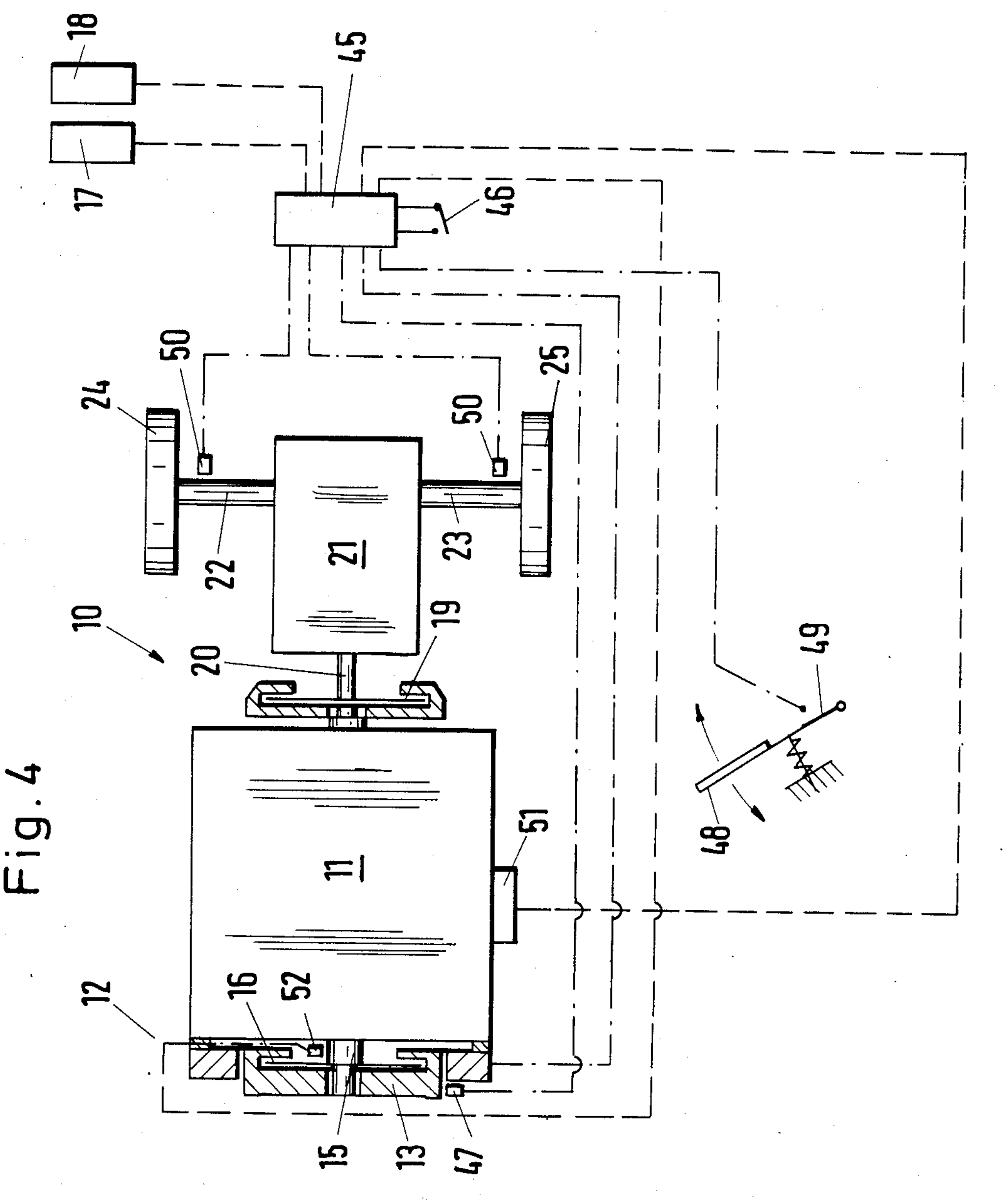
FIG. 4 is a block diagram of a propulsion system which constitutes a modification of the propulsion system shown in FIG. 1.

FIG. 4 illustrates a propulsion system which constitutes a modification of the propulsion system shown in FIG. 1. The reference characters which are shown in FIG. 4 are identical with those employed in FIG. 1. The difference between the two embodiments is that, in FIG. 4, the flywheel starter generator 12 is located to the left of the power plant 11, i.e., the power plant is disposed between the clutches 16 and 19 and the clutch 19 is remote from the flywheel 13. This necessitates the mounting of tachometer generators 47 and 52 at locations which are disposed to the left of the power plant 11. In the embodiment of FIG. 4, the crankshaft 15 is the input-output shaft of the power plant 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A propulsion system, particularly for the wheels of automotive vehicles, comprising a power plant including a housing having a stationary component, a supporting surface on said stationary component and rotary output means;

a starter-generator unit including a flywheel coaxial with said output means, first clutch means actuatable to connect said output means with said flywheel so that the latter can drive said output means or vice versa, rotor means affixed to said flywheel, stator means, and means for securing said stator means directly to the supporting surface of said stationary component of said housing so that the stator means concentrically surrounds said rotor means and defines therewith a narrow gap;

transmission means having rotary input means; and second clutch means actuatable to connect said output means with said input means.

2. The propulsion system of claim 1, wherein said rotor means includes a coil-free rotor and said stator means comprises laminations surrounding said flywheel and windings supported by the laminations.

3. The propulsion system of claim 1, further comprising signal generating means for monitoring a plurality of parameters of the system and control means operative to effect actuation of said clutch means in response to reception of predetermined signals from said monitoring means.

4. The propulsion system of claim 1, wherein said surface is adjacent to said stator means and said securing means comprises sleeves extending through aligned holes provided therefor in said stator means and said surface.

5. The propulsion system of claim 4, wnerein said securing means further comprises threaded fasteners extending through said sleeves and meshing with said component.

6. The propulsion system of claim 1, wherein said flywheel includes a portion forming part of said first clutch means, adjacent to said surface and surrounded by said rotor means.

7. The propulsion system of claim 6, wherein said portion of said flywheel is the pressure plate of said first clutch means and further comprising means for holding said pressure plate against axial movement with reference to said output means.

8. The propulsion system of claim 6 wherein said portion of said flywheel includes a radially outwardly extending flange and said flywheel further comprises a substantially disc-shaped carrier, said rotor means being disposed between said carrier and said flange.

9. The propulsion system of claim 1, wherein said unit includes a heteropolar generator.

10. The propulsion system of claim 9, wherein said generator is a Schmidt-Lorenz generator.

11. The propulsion system of claim 9, wherein said stator comprises several discrete group of windings and each such group comprises a plurality of first windings flanked by field windings.

12. The propulsion system of claim 11, wherein the field windings of said groups are distributed asymmetrically, as considered in the circumferential direction of said rotor means.

13. The propulsion system of claim 11, further comprising control means connectable with said first windings so as to effect the operation of said unit as a starter or as a generator.

14. The propulsion system of claim 13, wherein said control means comprises converter means.

15. The propulsion system of claim 11, wherein said rotor means comprises an annulus of equidistant protuberances and said stator means further comprises a discrete set of equidistant webs, one set for each of said groups, the webs of each of said sets defining gaps and said first windings being installed in the gaps between the webs of the corresponding sets, the spacing between neighboring protuberances of said annulus being equal to n times the spacing between the neighboring webs of each of said sets, n being a whole number including one so that, when a protuberance registers with one web of a set, each other web of such set also registers with a discrete protuberance.

16. The propulsion system of claim 15, wherein said sets of webs are staggered with reference to each other, as considered in the circumferential direction of said rotor, in such a way that the webs of a first set register with the adjacent protuberances when the webs of at least one other set are out of register with the adjacent protuberances.

17. The propulsion system of claim 16, further comprising control means for supplying electrical energy to the frist windings of said groups in a predetermined sequence and sensor means for selecting said sequence in dependence on the angular positions of said protuberances with reference to said stator means.

18. The propulsion system of claim 17, wherein said sensor means comprises a plurality of sensors, one for each of said groups.

19. The propulsion system of claim 18, wherein said sensors are staggered with reference to each other, as considered in the circumferential direction of said rotor means.

20. The propulsion system of claim 18, wherein the operation of each of said sensors is based on the Namur principle.

21. The propulsion system of claim 18, wherein the operation of each of said sensors is based on the Wiegand principle.

22. The propulsion system of claim 18, wherein said sensors are selected from the group consisting of forked cells, inductive transducers, magnetoresistors, Hall generators and proximity detectors.

23. The propulsion system of claim 1, wherein said power plant is interposed between said first and second clutch means.

24. The propulsion system of claim 1, wherein one of said clutch means is immediately adjacent to and the other of said clutch means is remote from said flywheel.

25. The propulsion system of claim 1, wherein said power plant further comprises rotary input means coaxial with said output means, said first clutch means being interposed between said input means and said flywheel.

26. The propulsion system of claim 1, wherein said stator means is disposed between said supporting surface and said transmission microns, as considered in the axial direction of said flywheel.

* * * * *